United States Patent
Karlsson et al.

(10) Patent No.: US 9,067,499 B2
(45) Date of Patent: Jun. 30, 2015

(54) ARRANGEMENT AND METHOD FOR MEASUREMENTS ON HV BATTERY

(75) Inventors: Leif Karlsson, Sjuntorp (SE); Mats Josefsson, Save (SE)

(73) Assignee: V2 PLUG-IN HYBRID VEHICLE PARTNERSHIP HANDELSBO, Goteborg (SE)

( * ) Notice: Subject to any disclaimer, the term of this patent is extended or adjusted under 35 U.S.C. 154(b) by 312 days.

(21) Appl. No.: 13/610,070

(22) Filed: Sep. 11, 2012

(65) Prior Publication Data

US 2013/0063151 A1    Mar. 14, 2013

(30) Foreign Application Priority Data

Sep. 14, 2011 (EP) ..................... 11181235

(51) Int. Cl.
H01M 10/48 (2006.01)
G01R 31/36 (2006.01)
B60L 3/12 (2006.01)
B60L 11/18 (2006.01)

(52) U.S. Cl.
CPC ............... *B60L 3/12* (2013.01); *B60L 11/1851* (2013.01); *H01M 10/48* (2013.01); *H01M 2220/20* (2013.01); *B60L 11/1879* (2013.01); *B60L 2240/549* (2013.01); *Y02T 10/7005* (2013.01); *Y02T 10/705* (2013.01)

(58) Field of Classification Search
CPC ... B60L 11/1851; B60L 11/1879; B60L 3/12; H01M 10/48; G01R 31/36
USPC .......................... 324/426; 429/92, 93; 246/1 C
See application file for complete search history.

(56) References Cited

U.S. PATENT DOCUMENTS

| 5,349,289 | A | 9/1994 | Shirai |
| 5,859,580 | A | 1/1999 | Hashizawa et al. |
| 8,570,047 | B1 * | 10/2013 | Davies et al. ................. 324/434 |
| 2003/0085621 | A1 * | 5/2003 | Potega ............................ 307/18 |
| 2004/0038123 | A1 * | 2/2004 | Hisamitsu et al. ............. 429/147 |
| 2008/0284375 | A1 * | 11/2008 | Nagaoka et al. .............. 320/116 |
| 2011/0050204 | A1 | 3/2011 | Park |

FOREIGN PATENT DOCUMENTS

| DE | 19535294 | 3/1997 |
| DE | 19703109 | 4/1998 |

OTHER PUBLICATIONS

International Search Report and Written Opinion from corresponding EP Application No. EP11181235.0, dated Mar. 15, 2012.

* cited by examiner

*Primary Examiner* — M'Baye Diao
(74) *Attorney, Agent, or Firm* — Renner, Otto, Boisselle & Sklar, LLP.

(57) ABSTRACT

An arrangement (1) for measuring current on a high voltage battery (12) for an electrical vehicle, wherein the battery comprises a service disconnect switch (13) which is adapted to break the connection between the positive battery terminal (14) and the positive battery output terminals (15). The connection between the positive battery terminal (14) and the positive battery output terminals (15) comprises an external circuit line (21) extending out of the service disconnect switch (13) such that a loop is created, which is adapted to receive a current clamp for measuring the current through the circuit line (21).

6 Claims, 1 Drawing Sheet

ARRANGEMENT AND METHOD FOR MEASUREMENTS ON HV BATTERY

TECHNICAL FIELD

This invention relates to an arrangement and a method for measuring voltage and current of a high voltage battery in an electrical vehicle.

BACKGROUND OF THE INVENTION

Rechargeable batteries comprising battery cells of the lithium-ion (Li-ion) or nickel-metal hydride (Ni-MH) type, or similar, have become increasingly used as an energy source for powering electrical vehicles and other devices, such as boat engines and cleaning machines, as well as for powering e.g. cellular network base stations in remote areas.

In such applications, several battery cells are connected in series and/or parallel in a battery module such as to be capable of delivering the required power. In order to be able to deliver the required power and to limit the energy losses, the battery cells are normally connected in series such that a high voltage battery is obtained. The high voltage battery is connected to the electrical system of the vehicle through positive and negative output terminals.

There is a need to monitor different properties of the high voltage (HV) battery, such as the voltage over the output terminals, the total current delivered by the battery, the temperature of the battery etc. Some of these properties can be measured and estimated by the battery itself and other on-board systems of the vehicle. For some measurements, the on-board measurements cannot be used. Instead, actual "live" measurements are required.

One such occasion is when measuring driving cycles for the electrical vehicle. When the vehicle performs a driving cycle according to the New European Driving Cycle (NEDC), which is supposed to represent the typical usage of a car in Europe, it is important that the voltage and the current delivered by the battery is measured outside of the vehicle, with separate measurement equipment. Other situations when external measurement equipment is of advantage is e.g. when the vehicle is in a work shop for maintenance.

During such a test, a separate current clamp is used for each positive or negative output terminal and separate clamps are also used to measure the voltage of the battery. There is thus room for an improved battery measuring arrangement.

SUMMARY OF THE INVENTION

An object of this invention is therefore to provide an arrangement for measuring current on a high voltage battery for an electrical vehicle. A further object of the invention is to provide an arrangement for measuring voltage on a high voltage battery for an electrical vehicle.

This object is achieved by the arrangement defined by the technical features contained in independent claim 1. The dependent claims contain advantageous embodiments, further developments and variants of the invention.

In an arrangement for measuring current on a high voltage battery for an electrical vehicle, where the battery comprises a service disconnect switch which is adapted to break the connection between the positive battery terminal and the positive battery output terminals, the object of the invention is achieved in that the connection between the positive battery terminal and the positive battery output terminals comprises an external circuit line extending out of the service disconnect switch such that a loop is created, which is adapted to receive a current clamp for measuring the current through the circuit line.

In this way, an arrangement for measuring current on a high voltage battery for an electrical vehicle is provided, which allows the current measurement to be performed by an external measurement equipment in an easy manner. Due to the fact that the external circuit line constitutes a loop extending away from the service disconnect switch, a current clamp can easily be clamped around the circuit line. Since the service disconnect switch is adapted to break the complete current from the battery cells to the battery output terminals, the complete current used by the vehicle will pass through the service disconnect switch and thus through the circuit line. In this way, the complete current used by the vehicle can be measured with only one current clamp in an easy and cost effective way.

Further, by arranging an extending circuit line on the service disconnect switch, an easy access for the current clamp is obtained. In this way, it suffices to apply one current clamp in an easy way, instead of having to apply several current clamps on different current carrying cables, one for each battery output terminal. Further, the reading of the actual current value is facilitated since one measuring device is enough.

It is also possible to arrange voltage measuring terminals on the service disconnect switch. In this way, also the voltage measurement of the battery is facilitated, since the measuring terminals can be accessed in an easy way. Since the measurements are to be performed on the battery when it is positioned in the vehicle and the vehicle is e.g. running on a roller test bench, it is of advantageous to provide an easy access to the measurement terminals.

The circuit line may either be a rigid cable or a flexible cable. Preferably, the circuit line is relatively short in order to minimize the power loss and to minimize disturbances picked up by the circuit line. The length is adapted to the actual position of the service disconnect switch on the battery such that an easy access is provided to the circuit line on the vehicle.

BRIEF DESCRIPTION OF DRAWINGS

In the description of the invention given below reference is made to the following figures, in which.

DESCRIPTION OF EXAMPLE EMBODIMENTS OF THE INVENTION

The embodiments of the invention with further developments described in the following are to be regarded only as examples and are in no way to limit the scope of the protection provided by the patent claims.

Figure 1:
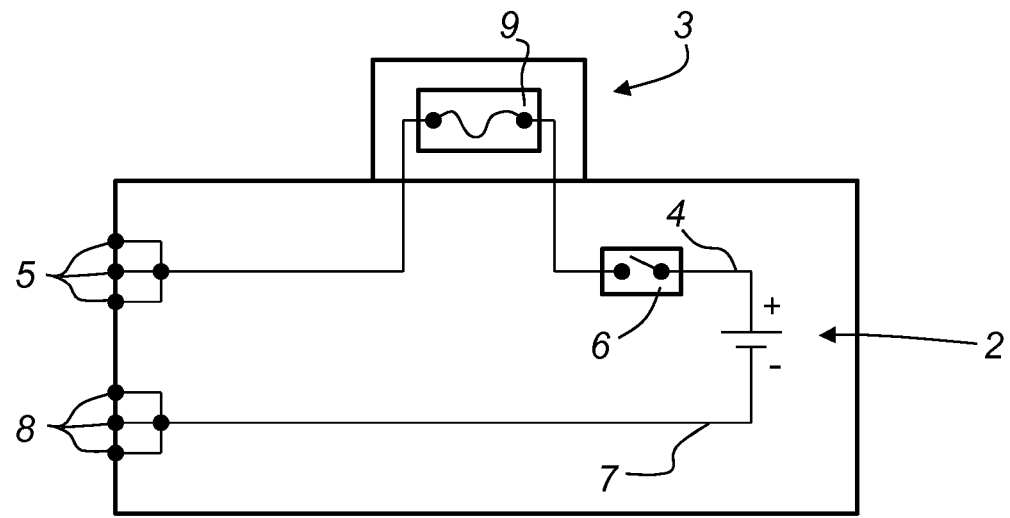
FIG. 1 shows a schematic battery with a prior art service disconnect switch.

FIG. 1 shows a known battery for an electrical vehicle. The battery 2 comprises a number of battery cells, a housing, internal connections, output terminals and a service disconnect switch 3. The battery cells are connected in series and/or in parallel in order to provide the required voltage and power capacity. The battery cells have a positive battery terminal 4 and a negative battery terminal 7. The battery is provided with a plurality of positive battery output terminals 5 and negative battery output terminals 8, which makes it possible to connect several different systems to the battery in an easy and reliable way. The battery also comprises a switch element 6 which is operated by an electrical signal of a control system and may be powered by a back-up power supply. The switch element may be a relay or a semiconductor switch. The switch element is adapted to disconnect the power line in the case of an emergency or an accident, in order to prevent a short circuit from drawing excessive current from the battery.

The service disconnect switch 3 is adapted to break the power from the battery completely in order to disconnect the battery cells from the electrical systems of the vehicle. The service disconnect switch is operated manually by a user such as a mechanic in order to disconnect the battery during maintenance. The service disconnect switch is simply removed from the battery such that the power line, in the shown case the positive power line, is disconnected. The service disconnect switch somewhat resembles a removable plug. The service disconnect switch may also comprise a fuse 9.

When external current and voltage measurements are to be performed on a vehicle comprising such a standard battery, current clamps must be applied to all current carrying cables connected to either the different positive battery output terminals 5 or the different negative battery output terminals 8. This requires several current clamps and several current measuring devices. Further, the access to the different cables may be prevented since it may be difficult to reach the cables. The same goes for voltage measurements, since it may be difficult to find a cable connection which is not covered or insulated. This is especially the case for high-voltage batteries where each terminal must be insulated for safety reasons.

With the inventive arrangement for measuring current on a high voltage battery for an electrical vehicle, the service disconnect switch is provided with a current measurement aid.

Figure 2:
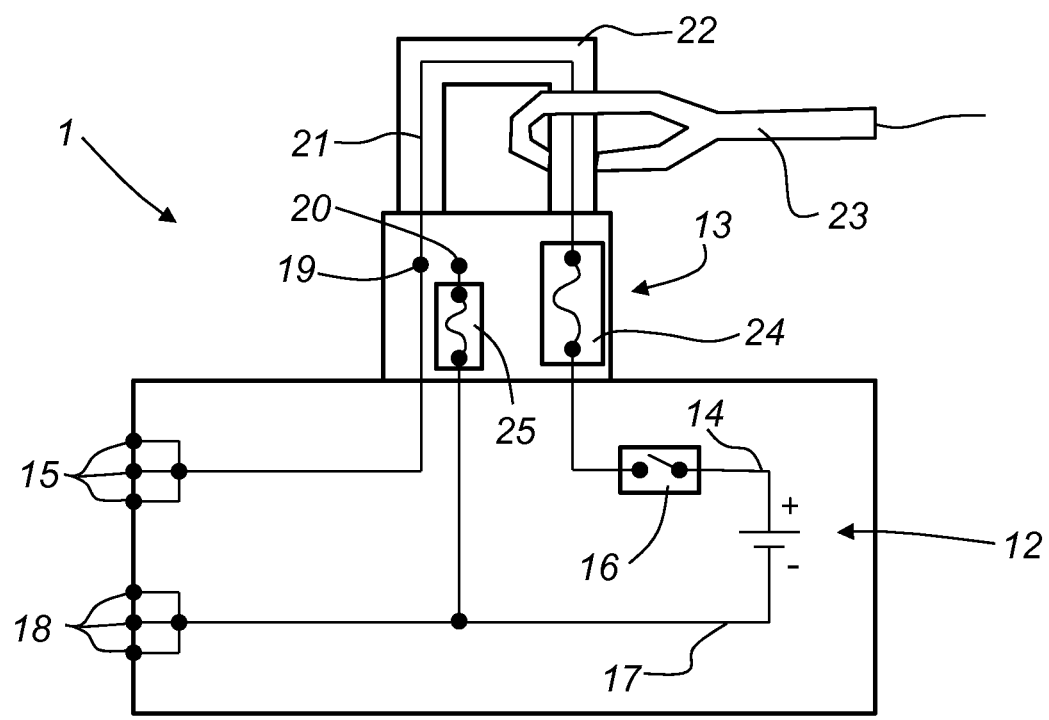
FIG. 2 shows a schematic battery with a service disconnect switch according to the invention.

FIG. 2 shows a battery for an electrical vehicle comprising an arrangement according to the invention. The battery 12 comprises a number of battery cells, a housing, internal connections, output terminals and a service disconnect switch 13. The battery cells are connected in series and/or in parallel in order to provide the required voltage and power capacity. The battery cells have a positive battery terminal 14 and a negative battery terminal 17. The battery is provided with a plurality of positive battery output terminals 15 and negative battery output terminals 18, which makes it possible to connect several different systems to the battery in an easy and reliable way. The battery also comprises a switch element 16 which is operated by an electrical signal of a control system and may be powered by a back-up power supply. The switch element may be a relay or a semiconductor switch. The switch element is adapted to disconnect the power line in the case of an emergency or an accident, in order to prevent a short circuit from drawing excessive current from the battery. The switch element may be applied either in the positive or negative power line. The switch element may also be connected to an interlock function of the vehicle, which detects if a high voltage connection is disconnected and automatically disconnects the battery from the electric system of the vehicle. It is also possible to provide each battery output terminal 15 and/or 18 with separate switch elements.

The service disconnect switch 13 is adapted to break the power from the battery completely in order to disconnect the battery cells from the electrical systems of the vehicle. The service disconnect switch 13 is operated manually by a user, such as a mechanic, in order to disconnect the battery during maintenance. The service disconnect switch is simply removed from the battery such that the power line, in the shown case the positive power line, is disconnected. The service disconnect switch is thus connected to the battery by plug and socket terminals. The service disconnect switch may also comprise a fuse 24 for extra protection.

In order to facilitate external measurement of the current of the battery 12, the service disconnect switch 13 is provided with an external circuit line 21 which is connected in series with the positive battery terminal 14 and the positive battery output terminals 15, connecting the positive battery terminal 14 with the positive battery output terminals 15. The external circuit line 21 extends out of the service disconnect switch 13 such that a loop is created. The circuit line may be a rigid wire which forms a rectangular or semi-circular loop. The circuit line may also be a flexible cable. The circuit line may extend relatively far out of the service disconnect switch in order to provide an easy access to the loop. The loop is adapted to receive a current clamp 23 for measuring the current through the circuit line.

The circuit line is preferably insulated with an insulating material 22 such as plastic or rubber. If the circuit line is rigid, the insulation may be integrated with the housing of the service disconnect switch. If the circuit line is flexible, the insulation may be the insulation of the cable itself or may be an additional flexible insulation.

The service disconnect switch may also be provided with a positive voltage measuring terminal 19 connected to the circuit line 21 and a negative voltage measuring terminal 20 connected to the negative terminal of the battery 17. The measuring terminals 19, 20 may be standardized connectors such as high voltage banana sockets used for measurement equipments or other suitable fuse protected connectors. By placing voltage output terminals on the service disconnect switch, an easy access for voltage measurements is also provided. One or both measuring terminals may also be provided with a small fuse that will short circuit protect the terminal. In the shown example, terminal 20 is provided with a fuse 25. The service disconnect switch is preferably positioned on the battery such that an easy access to the measurement terminals is allowed. The service disconnect switch is preferably positioned under a service door or the like of the vehicle for easy access.

The measuring terminals 19, 20 can also be used for measuring the actual current leakage between a battery output terminal and the chassis of the vehicle. The battery is provided with a built-in current leakage detection system, which will output an error message when a specific, predetermined current leakage occurs. In order to test this function, a variable resistor is connected between either the positive voltage measuring terminal 19 or the negative voltage measuring terminal 20 and the chassis of the vehicle. The resistor value is varied until the error message is output. The actual current leakage value can now be determined from the resistor value. In this way, it is possible to test the current leakage system of the battery in order to verify the function and the trip value of the current leakage system.

When external current and voltage measurements are to be performed on a vehicle comprising an inventive measurement arrangement, a standard current clamp is applied to the loop formed by the circuit line. Since all current supplied form the battery passes through the circuit line, one current clamp suffice. For voltage measurements, the voltage measuring device is connected to the voltage measuring terminals with a suitable connector. In this way, a simple and reliable external measurement of the current and voltage of the battery may be performed.

The invention is not to be regarded as being limited to the embodiments described above, a number of additional variants and modifications being possible within the scope of the subsequent patent claims.

REFERENCE SIGNS

1: Arrangement
2: Battery
3: Service disconnect switch
4: Positive battery terminal
5: Positive battery output terminal
6: Switch element
7: Negative battery terminal
8: Negative battery output terminal
9: Fuse
12: Battery
13: Service disconnect switch
14: Positive battery terminal
15: Positive battery output terminal
16: Switch element
17: Negative battery terminal
18: Negative battery output terminal
19: Positive voltage measuring terminal
20: Negative voltage measuring terminal
21: Circuit line
22: Insulating material
23: Current clamp
24: Fuse
25: Fuse

The invention claimed is:

1. An arrangement for measuring current on a high voltage battery for an electrical vehicle, where the battery comprises a service disconnect switch which is adapted to break the connection between the positive battery terminal and the positive battery output terminals, wherein the connection between the positive battery terminal and the positive battery output terminals comprises an external circuit line extending out of the service disconnect switch and returning to the battery such that a loop is created, which is adapted to receive a current clamp for measuring the current through the circuit line.

2. An arrangement according to claim 1, wherein the service disconnect switch further comprises a positive voltage measuring terminal connected to the circuit line and a negative voltage measuring terminal connected to the negative terminal of the battery.

3. An arrangement according to claim 1, wherein the circuit line is insulated with an insulating material.

4. An arrangement according to claim 3, wherein the circuit line is rigid.

5. An arrangement according to claim 3, wherein the circuit line is flexible.

6. A vehicle, comprising the arrangement according to claim 1.

* * * * *